US012575474B2

(12) United States Patent
Miyamoto

(10) Patent No.: US 12,575,474 B2
(45) Date of Patent: Mar. 17, 2026

(54) AUTOMATIC TRAVELING METHOD, AUTOMATIC TRAVELING SYSTEM, AND AUTOMATIC TRAVELING PROGRAM

(71) Applicant: Yanmar Holdings Co., Ltd., Osaka (JP)

(72) Inventor: Shinnosuke Miyamoto, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 109 days.

(21) Appl. No.: 18/374,992

(22) Filed: Sep. 29, 2023

(65) Prior Publication Data

US 2024/0107930 A1 Apr. 4, 2024

(30) Foreign Application Priority Data

Sep. 29, 2022 (JP) ................................. 2022-156173

(51) Int. Cl.
*G05D 1/00* (2024.01)
*A01B 69/04* (2006.01)

(52) U.S. Cl.
CPC ......... *A01B 69/008* (2013.01); *G05D 1/0044* (2013.01); *G05D 1/0219* (2013.01)

(58) Field of Classification Search
CPC .... A01B 69/008; A01B 69/00; G05D 1/0044; G05D 1/0219; G05D 2105/15; G05D 2107/21; G05D 2109/10; G05D 1/2297; G05D 1/648; G05D 1/0088; G05D 1/0212
See application file for complete search history.

(56) References Cited

U.S. PATENT DOCUMENTS

| | | | | |
|---|---|---|---|---|
| 7,715,979 B2 * | 5/2010 | Dix | ...................... | A01B 69/008 |
| | | | | 701/519 |
| 2006/0178823 A1 * | 8/2006 | Eglington | ............ | A01B 69/007 |
| | | | | 701/414 |
| 2017/0112045 A1 * | 4/2017 | Dix | ...................... | A01B 79/005 |
| 2021/0195823 A1 * | 7/2021 | Yuasa | .................. | G05D 1/0278 |

FOREIGN PATENT DOCUMENTS

| | | | | |
|---|---|---|---|---|
| CN | 112533474 A | * | 3/2021 | .............. G05D 1/43 |
| JP | 2021-040494 A | | 9/2019 | |
| WO | 2019124217 A | | 6/2019 | |

OTHER PUBLICATIONS

Extended European Search Report dated Mar. 1, 2024, issued in EP Patent Application No. 23195712.7.

* cited by examiner

*Primary Examiner* — Bao Long T Nguyen
(74) *Attorney, Agent, or Firm* — NORTON ROSE FULBRIGHT US LLP

(57) ABSTRACT

A vehicle control device causes a work vehicle to automatically travel in accordance with a target route set in advance. The generation processing unit generates, in a case where setting information related to automatic traveling is changed after the work vehicle starts automatic traveling corresponding to the target route, a target route with reference to a work-completed route along which the work vehicle has performed work immediately before. The vehicle control device causes the work vehicle to automatically travel in accordance with the target route.

17 Claims, 15 Drawing Sheets

AUTOMATIC TRAVELING METHOD, AUTOMATIC TRAVELING SYSTEM, AND AUTOMATIC TRAVELING PROGRAM

CROSS-REFERENCE TO RELATED APPLICATIONS

This application claims priority under 35 U.S.C. § 119 to JP Application No. 2022-156173 filed Sep. 29, 2022 the entire contents of which are hereby incorporated by reference.

TECHNICAL FIELD

The present invention relates to an automatic traveling method, an automatic traveling system, and an automatic traveling program for causing a work vehicle to automatically travel in accordance with a target route in a field or the like.

BACKGROUND ART

Conventionally, as a work vehicle capable of automatic traveling, there is known a work vehicle that automatically travels in accordance with a target route only when traveling straight ahead, and travels (manually travels) in response to manual steering (manual operation) by an operator when turning. In addition, a technique is known in which a traveling trajectory along which a work vehicle travels straight by manual steering is set as a reference line, and a target route including a plurality of straight routes substantially parallel to the reference line is generated based on a width of a work machine (work width) and a width in which adjacent work areas overlap each other (lap width) (see, for example, Patent Document 1).

PRIOR ART DOCUMENT

Patent Document

Patent Document 1: Japanese Unexamined Patent Application Publication No. 2021-040494

SUMMARY OF INVENTION

Technical Problem

After the work vehicle starts automatic traveling based on the target route, when setting information related to the automatic traveling such as the work width and the lap width is changed, the target route is regenerated. In this case, in the conventional technique, since the target route is regenerated based on the reference line, there is a problem in that an unworked area is generated between a work area worked in accordance with the target route generated in advance and a work area worked in accordance with the regenerated target route, or an overlap amount between both work areas becomes larger than the set and changed lap width (see FIG. 13 described below).

An object of the present invention is to provide an automatic traveling method, an automatic traveling system, and an automatic traveling program capable of causing a work vehicle to automatically travel in an appropriate manner even when setting information related to automatic traveling is changed.

Solution to Problem

An automatic traveling method according to the present invention includes: causing a work vehicle to automatically travel in accordance with a first target route set in advance; generating, in a case where setting information related to automatic traveling is changed after the work vehicle starts automatic traveling corresponding to the first target route, a second target route with reference to a work-completed route along which the work vehicle has performed work immediately before; and causing the work vehicle to automatically travel in accordance with the second target route.

An automatic traveling system according to the present invention includes a first travel processing unit, a generation processing unit, and a second travel processing unit. The first travel processing unit causes the work vehicle to automatically travel in accordance with a first target route set in advance. The generation processing unit generates, in a case where setting information related to automatic traveling is changed after the work vehicle starts automatic traveling corresponding to the first target route, a second target route with reference to a work-completed route along which the work vehicle has performed work immediately before. The second travel processing unit causes the work vehicle to automatically travel in accordance with the second target route.

An automatic traveling program according to the present invention is an automatic traveling program for causing one or more processors to execute causing a work vehicle to automatically travel in accordance with a first target route set in advance; generating, in a case where setting information related to automatic traveling is changed after the work vehicle starts automatic traveling corresponding to the first target route, a second target route with reference to a work-completed route along which the work vehicle has performed work immediately before; and causing the work vehicle to automatically travel in accordance with the second target route.

Advantageous Effects of Invention

According to the present invention, it is possible to provide an automatic traveling method, an automatic traveling system, and an automatic traveling program capable of causing a work vehicle to automatically travel in an appropriate manner even when setting information related to automatic traveling is changed.

DESCRIPTION OF EMBODIMENTS

Embodiments below are examples that embody the present invention and are not intended to limit the technical scope of the present invention.

The automatic traveling system according to an embodiment of the present invention includes a work vehicle 10, a satellite (not illustrated), and a base station (not illustrated). In the present embodiment, a case where the work vehicle 10 is a tractor will be described as an example. Note that, as another embodiment, the work vehicle 10 may be a rice transplanter, a combine harvester, a construction machine, a snowplow, or the like. The work vehicle 10 performs a predetermined work (for example, cultivation work) while traveling in accordance with a target route in response to an operation of an operator (user) in a field F (see FIG. 10). In particular, the work vehicle 10 travels straight on the target route in response to automatic steering and travels while turning in response to manual steering (driving operation) by the operator. The work vehicle 10 travels in the field F and performs work while switching between automatic traveling along straight routes and manual traveling along turning routes. The target route may be generated in advance based on the operator's operations and stored as route data.

Figure 10:
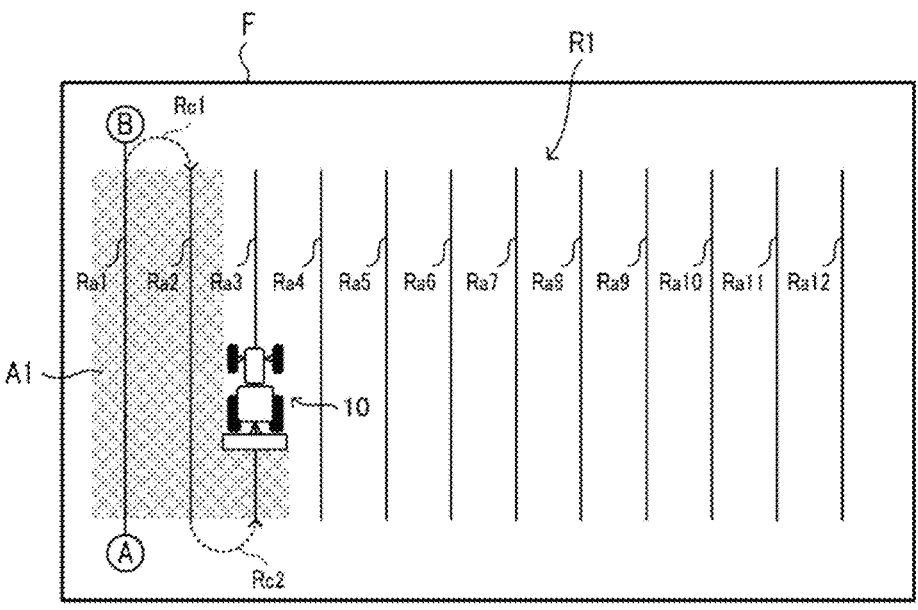
FIG. 10 is a diagram illustrating an example of a target route according to the embodiment of the present invention.

The work vehicle 10 travels in the field F illustrated in FIG. 10, for example, repeating straight traveling and turning traveling until the work is completed. A target route R1 for automatic traveling includes a plurality of straight routes (work routes). The plurality of straight routes are substantially parallel to one another. FIG. 10 illustrates work routes Ra1 to Ra12. For example, the work vehicle 10 sequentially executes automatic traveling along the work route Ra1, manual traveling along a turning route Rc1, automatic traveling along a work route Ra2, manual traveling along a turning route Rc2, and automatic traveling along a work route Ra3. A reference sign A1 illustrated in FIG. 10 indicates a work trajectory (a work-completed area) in which the work vehicle 10 has traveled and worked.

The target route R1 illustrated in FIG. 10 is an example, and the target route R1 is appropriately determined in accordance with the size of the work vehicle 10, a width of a work machine 14 (work width), a width in which adjacent work areas overlap each other (lap width), a work content, the shape of the field F, and the like.

Note that, the automatic traveling system may include an operation terminal (tablet terminal, smartphone, etc.) which is operated by the operator. The operation terminal can communicate with the work vehicle 10 via a communication network such as a cellular telephone line network, a packet line network, or a wireless LAN. For example, the operator operates the operation terminal to register various types of information (such as work vehicle information, field information, work information, etc.) and the like. Furthermore, the operator can confirm traveling conditions, working conditions, and the like of the work vehicle 10 at a location away from the work vehicle 10 by the traveling trajectory displayed on the operation terminal. The operation terminal may be an operation device 17 (see FIG. 1) disposed in the work vehicle 10.

[Work Vehicle 10]

Figure 1:
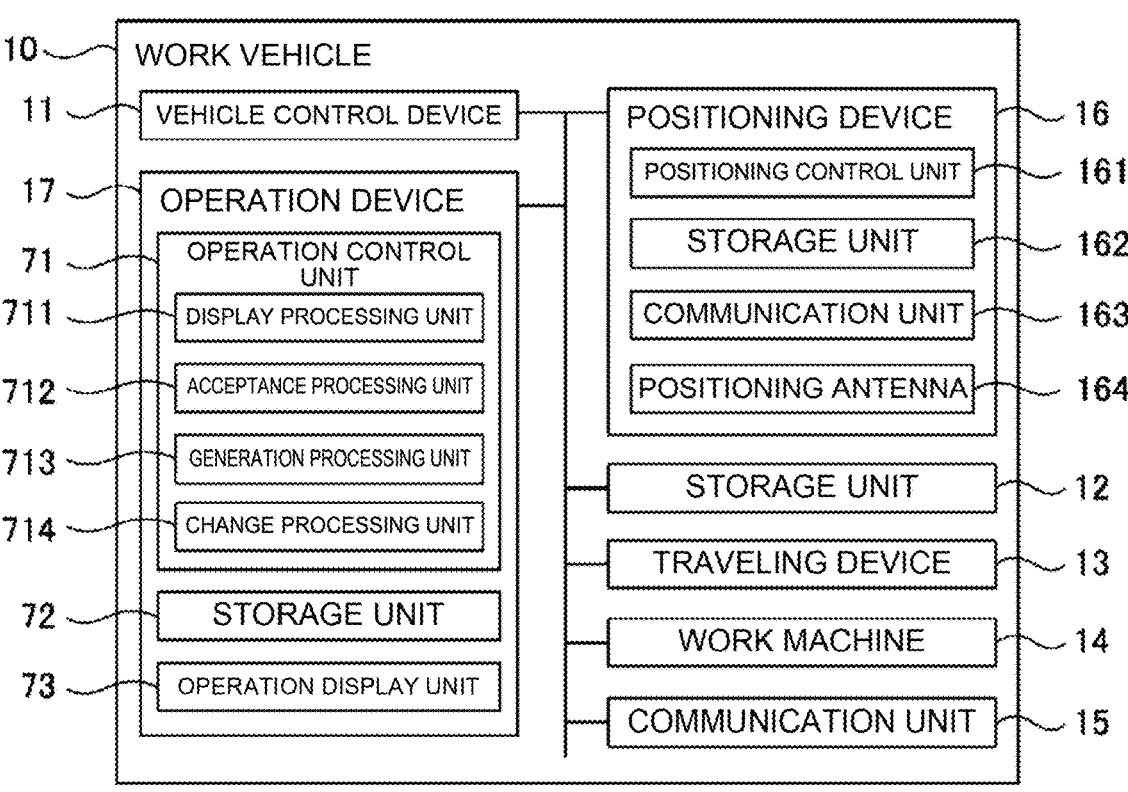
FIG. 1 is a block diagram showing a configuration of a work vehicle according to an embodiment of the present invention.
Figure 2:
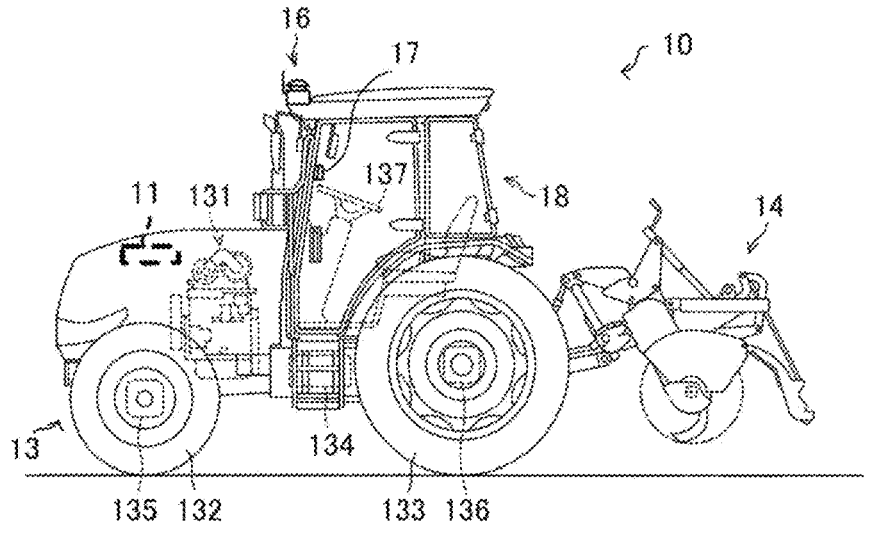
FIG. 2 is an external view illustrating an example of the work vehicle according to the embodiment of the present invention.

As illustrated in FIG. 1 and FIG. 2, the work vehicle 10 includes a vehicle control device 11, a storage unit 12, a traveling device 13, the work machine 14, the communication unit 15, a positioning device 16, and the operation device 17. The vehicle control device 11 is electrically connected to the storage unit 12, the traveling device 13, the work machine 14, the positioning device 16, the operation device 17, and the like. Note that, the vehicle control device 11 and the positioning device 16 may be capable of wireless communication. Furthermore, the vehicle control device 11 and the operation device 17 may be capable of wireless communication.

The communication unit 15 is a communication interface for connecting the work vehicle 10 to a communication network by wired or wireless means and executing data communication in accordance with a predetermined communication protocol with an external device (such as an operation terminal) via the communication network.

The storage unit 12 is a non-volatile storage unit such as a Hard Disk Drive (HDD) or a Solid State Drive (SSD) that stores various types of information. The storage unit 12 stores a control program such as an automatic traveling program for causing the vehicle control device 11 and an operation control unit 71 to execute an automatic traveling process (see FIGS. 15 and 18) described below. For example, the automatic traveling program is non-temporarily recorded on a computer-readable recording medium such as a CD or a DVD, which is read by a predetermined reading device (not illustrated) and stored in the storage unit 12.

Note that, the automatic traveling program may be downloaded from a server (not illustrated) to the work vehicle via a communication network and stored in the storage unit 12. Further, the storage unit 12 may also store data of the target route generated at the operation device 17.

The traveling device 13 is a driving part that causes the work vehicle 10 to travel. As illustrated in FIG. 2, the traveling device 13 includes an engine 131, front wheels 132, rear wheels 133, a transmission 134, a front axle 135, a rear axle 136, a steering wheel 137, and the like. Note that the front wheels 132 and the rear wheels 133 are provided on left and right of the work vehicle 10, respectively. Furthermore, the traveling device 13 is not limited to a wheel type having the front wheels 132 and the rear wheels 133, and may be a crawler type having crawlers provided on the right and left of the work vehicle 10.

The engine 131 is a drive source such as a diesel engine or a gasoline engine driven using fuel that is supplied by a fuel tank which is not illustrated. The traveling device 13 may also be equipped with an electric motor as a drive source, either together with the engine 131 or instead of the engine 131. Note that a power generator, which is not illustrated, is connected to the engine 131, and electric power is supplied from the power generator to electrical components such as the vehicle control device 11, a battery, and the like which are provided in the work vehicle 10. Note that the battery is charged by the power supplied by the power generator. Additionally, the electrical components such as the vehicle control device 11, the positioning device 16, the operation device 17, and the like provided in the work vehicle 10 can be driven by the power supplied from the battery even after the engine 131 is stopped.

The driving force of the engine 131 is transmitted to the front wheels 132 via the transmission 134 and the front axle 135, and to the rear wheels 133 via the transmission 134 and the rear axle 136. The driving force of the engine 131 is also transmitted to the work machine 14 via a PTO shaft (not illustrated). The traveling device 13 performs a traveling action according to a command from the vehicle control device 11.

The work machine 14 may be, for example, a cultivator, a seeder, a mower, a plow, a fertilizer applicator, or the like, which can be attached to and detached from the work vehicle 10. This allows the work vehicle 10 to perform various types of work by using each work machine 14. FIG. 2 illustrates a case where the work machine 14 is a cultivator. The work machine 14 may be supported in the work vehicle 10 by a lift mechanism (not illustrated) capable of lifting and lowering. The vehicle control device 11 can control the lift mechanism to lift and lower the work machine 14.

The steering wheel 137 is an operation part operated by the operator or the vehicle control device 11. For example, the traveling device 13 changes the angle of the front wheels 132 by means of a hydraulic power steering mechanism (not illustrated) or the like in response to the operation of the steering wheel 137 by the operator or the vehicle control device 11, thereby changing an advancing direction of the work vehicle 10.

In addition to the steering wheel 137, the traveling device 13 includes a shift lever, an accelerator, a brake, and the like (not illustrated) that are operated by the vehicle control device 11. Also, in the traveling device 13, the gear of the transmission 134 is switched to a forward gear, a reverse gear, or the like according to the operation of the shift lever by the vehicle control device 11, thereby switching the traveling mode of the work vehicle 10 to forward, reverse, or the like. Furthermore, the vehicle control device 11 also controls the rotational frequency of the engine 131 by operating the accelerator. Additionally, the vehicle control device 11 also operates the brake to stop the rotation of the front wheels 132 and the rear wheels 133 by using an electromagnetic brake.

The positioning device 16 is a communication device equipped with a positioning control unit 161, a storage unit 162, a communication unit 163, a positioning antenna 164, and the like. For example, as illustrated in FIG. 2, the positioning device 16 is provided on an upper portion of a cabin 18 in which the operator boards. In addition, an installation position of the positioning device 16 is not limited to the cabin 18. Furthermore, the positioning control unit 161, the storage unit 162, the communication unit 163, and the positioning antenna 164 of the positioning device 16 may be separately disposed at different positions in the work vehicle 10. Note that, as mentioned above, the battery is connected to the positioning device 16, so the positioning device 16 can operate even when the engine 131 is stopped. In addition, as the positioning device 16, for example, a mobile phone terminal, a smart phone, a tablet terminal, or the like may be substituted.

The positioning control unit 161 is a computer system that includes one or more processors and a storage memory such as such as a non-volatile memory and a RAM. The storage unit 162 is a nonvolatile memory or the like that stores a positioning control program for causing the positioning control unit 161 to execute positioning processing, and data such as positioning information and movement information. For example, the positioning control program is non-temporarily recorded on a computer-readable recording medium such as a CD or a DVD, which is read by a predetermined reading device (not illustrated) and stored in the storage unit 162. Note that, the positioning control program may be downloaded from a server (not illustrated) to the positioning device 16 via a communication network and stored in the storage unit 162.

The communication unit 163 is a communication interface for connecting the positioning device 16 to a communication network by wired or wireless means and executing data communication in accordance with a predetermined communication protocol with an external device such as a base station server via the communication network.

The positioning antenna 164 is an antenna to receive a radio wave (GNSS signal) transmitted from a satellite.

The positioning control unit 161 calculates a current position of the work vehicle 10 based on the GNSS signal received by the positioning antenna 164 from the satellite. For example, in a case where the work vehicle 10 travels automatically in the field F, when the positioning antenna 164 receives radio waves (transmission time, orbital information, and the like) transmitted from each of a plurality of satellites, the positioning control unit 161 calculates a distance between the positioning antenna 164 and each satellite, and calculates, based on the calculated distance, a current position (latitude and longitude) of the work vehicle 10. Alternatively, the positioning control unit 161 may perform positioning using the real-time kinematic method (RTK-GNSS positioning method (RTK method)), which calculates the current position of the work vehicle 10 using correction information corresponding to a base station (reference station) near the work vehicle 10. Thus, the work vehicle 10 automatically travels using the positioning information by the RTK method. Note that, the current position of the work vehicle 10 may be the same as the positioning position (for example, the position of the positioning antenna 164), or may be a position that is offset from the positioning position.

The operation device 17 is a device operated by the operator boarding the work vehicle 10, and displays various types of information and accepts the operator's operation. Specifically, the operation device 17 displays various setting screens to accept various setting operations from the operator and displays information about the work vehicle 10 during traveling. A specific configuration of the operation device 17 will be described below.

The vehicle control device 11 has control apparatuses such as a CPU, a ROM, a RAM, and the like. The CPU is a processor that executes various types of arithmetic processing. The ROM is a non-volatile storage unit that previously stores control programs such as a BIOS and an OS for causing the CPU to execute various types of arithmetic processing. The RAM is a volatile or non-volatile storage unit that stores various types of information and is used as a temporary storage memory (work area) for various processing executed by the CPU. Then, the vehicle control device 11 causes the CPU to execute various types of control programs previously stored in the ROM or the storage unit 12, thereby controlling the work vehicle 10. In addition, the vehicle control device 11 executes various processing according to the automatic traveling program with the CPU.

Specifically, the vehicle control device 11 controls the traveling of the work vehicle 10. For example, the vehicle control device 11 causes the work vehicle 10 to travel manually based on the operator's operation (manual steering) when the traveling mode of the work vehicle 10 is manual traveling (manual traveling mode). For example, the vehicle control device 11 acquires operation information corresponding to driving operations by the operator, such as a steering wheel operation, a gear change operation, a shift operation, an accelerator operation, a brake operation, or the like, and causes the traveling device 13 to execute the traveling action based on the operation information.

Alternatively, when the traveling mode of the work vehicle 10 is automatic traveling (automatic traveling mode), the vehicle control device 11 causes the work vehicle 10 to automatically travel based on position information (positioning information) indicating the current position of the work vehicle 10 that is positioned by the positioning control unit 161. For example, when the work vehicle 10 satisfies an automatic traveling start condition and receives a travel start instruction from the operator, the vehicle control device 11 starts automatic traveling of the work vehicle 10 based on the positioning information. Further, the vehicle control device 11 causes the work vehicle 10 to automatically travel in accordance with the target route R1 (work route) (see FIG. 10) generated in advance.

Furthermore, the vehicle control device 11 switches the traveling mode to manual traveling when the work vehicle 10 reaches an end of a straight route. The vehicle control device 11 may switch the traveling mode to manual traveling when it is determined that the work vehicle 10 has reached the end, or the vehicle control device 11 may switch the traveling mode to manual traveling in response to the operator's operation. When the traveling mode is switched to manual traveling, for example, the operator causes the work vehicle 10 to travel while turning (manually travel) by manual steering (see FIG. 10). The position of the end of each work route is a position inside an end portion of the field F by a predetermined distance, a position specified in advance by the operator, a position alongside a position where the operator switches from automatic traveling to manual traveling on an immediately previous work-completed route (a position where the work route intersects with a line that is perpendicular to the work-completed route and passes through the position where the switch to manual is performed, or alternatively a position where the work route intersects with a line that is parallel to an edge of the field F and passes through the position where the switch to manual is performed), a position where the work route intersects with a line that is perpendicular to the reference line L1 and passes through point B of the reference line L1 (e.g., position Pe in FIG. 9C), or the like.

As described above, the vehicle control device 11 switches the traveling mode in response to the operation by the operator on the operation device 17 to cause the work vehicle 10 to automatically travel on a straight route (target route R1) by automatic steering and to travel manually on a turning route by manual steering. Although the details will be described below, when the setting information related to the automatic traveling is changed, the vehicle control device 11 causes the work vehicle 10 to automatically travel in accordance with a regenerated target route (target route R2). The vehicle control device 11 is an example of a first travel processing unit and a second travel processing unit of the present invention.

[Operation Device 17]

As illustrated in FIG. 1, the operation device 17 includes the operation control unit 71, a storage unit 72, and an operation display unit 73, and the like. The operation device 17 may be a device that can be attached to and detached from the work vehicle 10. Alternatively, the operation device 17 may be a portable terminal (tablet terminal, smartphone, etc.) that can be carried by the operator. The operation device 17 is communicably connected to the vehicle control device 11 by wired or wireless means.

The operation display unit 73 is a user interface equipped with a display part, such as a liquid crystal display or an organic EL display, that displays various types of information, and an operation part, such as operation buttons or a touch panel, that accepts operations. The operation display unit 73 displays various setting screens, operation screens, travel screens, and the like in accordance with instructions from the operation control unit 71. In addition, the operation display unit 73 accepts the operator's operation on each of the screens.

Furthermore, the operation part also includes an automatic traveling button for the operator to give the travel start instruction when causing the work vehicle 10 to start automatic traveling, a shift button for performing a correction operation (shift operation) to correct a positional deviation between the work vehicle 10 and the target route, and a plurality of selection buttons for performing selection operations on each screen (all are not illustrated). These operation buttons may be physical buttons or electronic image buttons displayed on a touch panel.

Figure 3:
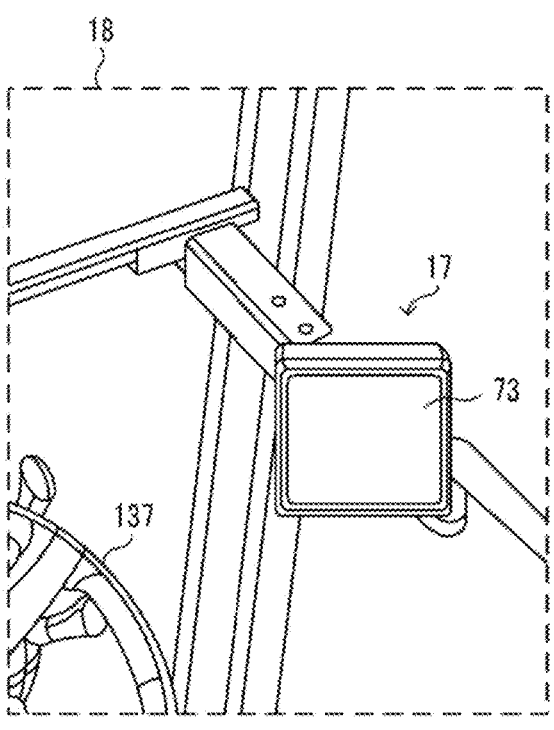
FIG. 3 is an external view illustrating an example of an operation device according to the embodiment of the present invention.

The operation device 17 is, for example as illustrated in FIG. 2 and FIG. 3, installed near the steering wheel 137 in the cabin 18.

The storage unit 72 is a non-volatile storage unit, such as an HDD, an SSD, or the like, that stores various types of information. The storage unit 72 stores control programs such as an automatic traveling program for causing the vehicle control device 11 and the operation device 17 to execute automatic traveling processing (see FIG. 15 and FIG. 18) that will be described below. For example, the automatic traveling program is non-temporarily recorded on a computer-readable recording medium such as a CD or a DVD, which is read by a predetermined reading device (not illustrated) and stored in the storage unit 72. Note that the automatic traveling program may be downloaded from a server (not illustrated) to the operation device 17 via a communication network and stored in the storage unit 72. Alternatively, the automatic traveling program may be stored in the storage unit 12 of the work vehicle 10. Further, the storage unit 72 may also store the data of the target route generated at the operation device 17. The automatic traveling program may include a route generation program that generates a target route.

The operation control unit 71 has control apparatuses such as a CPU, a ROM, a RAM, and the like. The CPU is a processor that executes various types of arithmetic processing. The ROM is a non-volatile storage unit that previously stores control programs such as a BIOS and an OS for causing the CPU to execute various types of arithmetic processing. The RAM is a volatile or non-volatile storage unit that stores various types of information and is used as a temporary storage memory (work area) for various processing executed by the CPU. Then, the operation control unit 71 causes the CPU to execute the various control programs previously stored in the ROM or the storage unit 72, thereby controlling the operation device 17.

More specifically, as illustrated in FIG. 1, the operation control unit 71 includes various processing units such as a display processing unit 711, an acceptance processing unit 712, a generation processing unit 713, and a change processing unit 714. The operation device 17 functions as the various processing units by executing various processing with the CPU in accordance with the automatic traveling program. In addition, some or all of the processing units may be composed of electronic circuits. Note that the automatic traveling program may be a program to cause a plurality of processors to function as the processing units.

The display processing unit 711 causes the operation display unit 73 to display various types of information. For example, the display processing unit 711 causes the operation display unit 73 to display a setting screen for performing various settings (for example, setting screens P1 to P4 of FIGS. 4, 5A, 5B, 6, and 7), an operation screen when generating a target route (for example, operation screen D1 of FIGS. 8A and 8B), a travel screen including travel information such as traveling conditions, working conditions, and the like of the work vehicle 10 (for example, travel screen D2 of FIG. 12).

The acceptance processing unit 712 accepts various operations by the operator. For example, the acceptance processing unit 712 receives, on the setting screen, an operation of inputting setting information for causing the work vehicle 10 to automatically travel from the operator, and receives, on the operation screen, an operation for generating the target route, that is, various operations related to route generation work from the operator.

Figure 4:
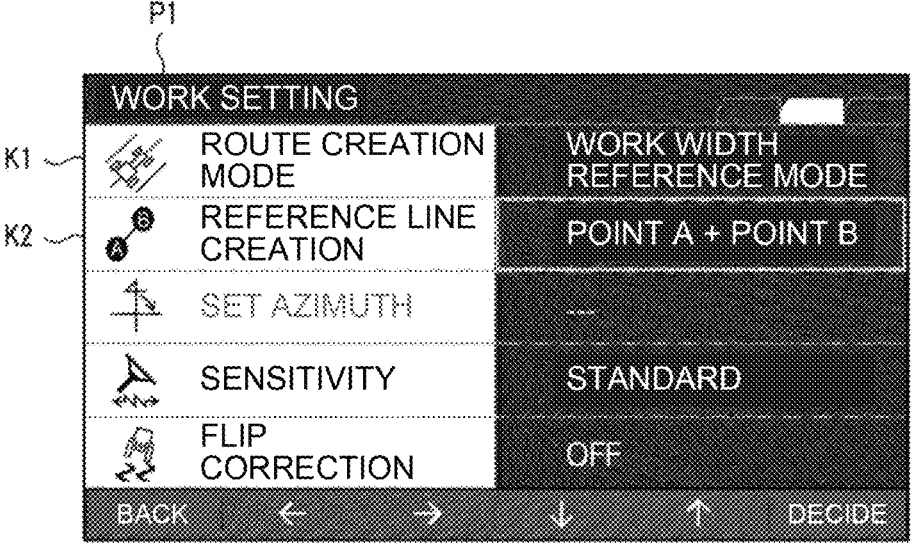
FIG. 4 is a diagram illustrating an example of a setting screen displayed on the operation device according to the embodiment of the present invention.
Figures 5A, 5B:
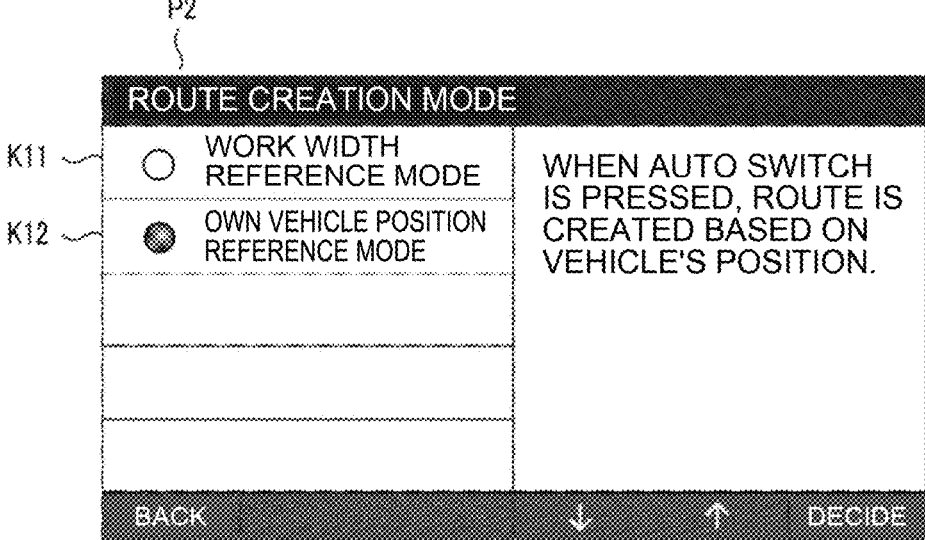
FIG. 5A is a diagram illustrating an example of a setting screen displayed on the operation device according to the embodiment of the present invention.
FIG. 5B is a diagram illustrating an example of a setting screen displayed on the operation device according to the embodiment of the present invention.

For example, the setting screen P1 (work setting screen) illustrated in FIG. 4 includes a selection column K1 for "route creation mode" and a selection column K2 for "reference line creation". When the operator selects the selection column K1, the display processing unit 711 displays a setting screen P2 (route creation mode setting screen) illustrated in FIGS. 5A and 5B. On the setting screen P2, a "work width reference mode" and an "own vehicle position reference mode" are displayed in a selectable manner as selection candidates of the route creation mode. The "work width reference mode" is a route creation mode of generating a target route in accordance with the work width and the lap width, and the "own vehicle position reference mode" is a route creation mode of generating a target route with reference to the current position of the work vehicle. The route creation mode selected by the operator on the setting screen P2 of FIGS. 5A and 5B is displayed in the selection column K1 on the setting screen P1 of FIG. 4.

When the operator selects the selection column K2 on the setting screen P1 (see FIG. 4), the display processing unit 711 causes a plurality of creation methods of creating a reference line to be displayed in a selectable manner (not illustrated). The creation methods include, for example, a method of creating a reference line by designating point A (first reference point) and point B (second reference point) ("point A+point B"), a method of creating a reference line from the point A and a direction of the work vehicle ("point A+vehicle azimuth"), and a method of creating a reference line from the point A and a set azimuth ("point A+set azimuth"). In the present embodiment, it is assumed that the creation method of "point A+point B" is selected by the operator (see FIG. 4).

Figure 6:
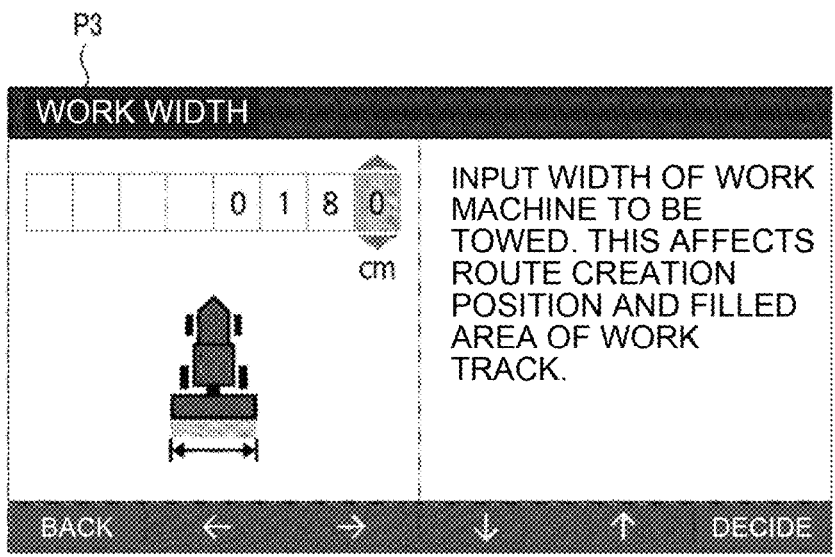
FIG. 6 is a diagram illustrating an example of a setting screen displayed on the operation device according to the embodiment of the present invention.

A setting screen P3 (work width setting screen) illustrated in FIG. 6 includes an input column for inputting a work width. The operator inputs the width of the work machine 14 (here, "180 cm") on the setting screen P3.

Figure 7:
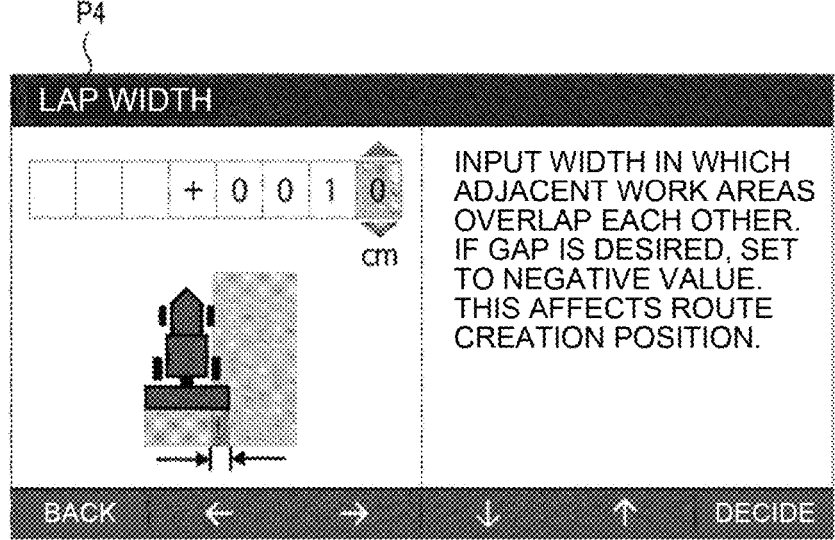
FIG. 7 is a diagram illustrating an example of a setting screen displayed on the operation device according to the embodiment of the present invention.
Figure 8A:
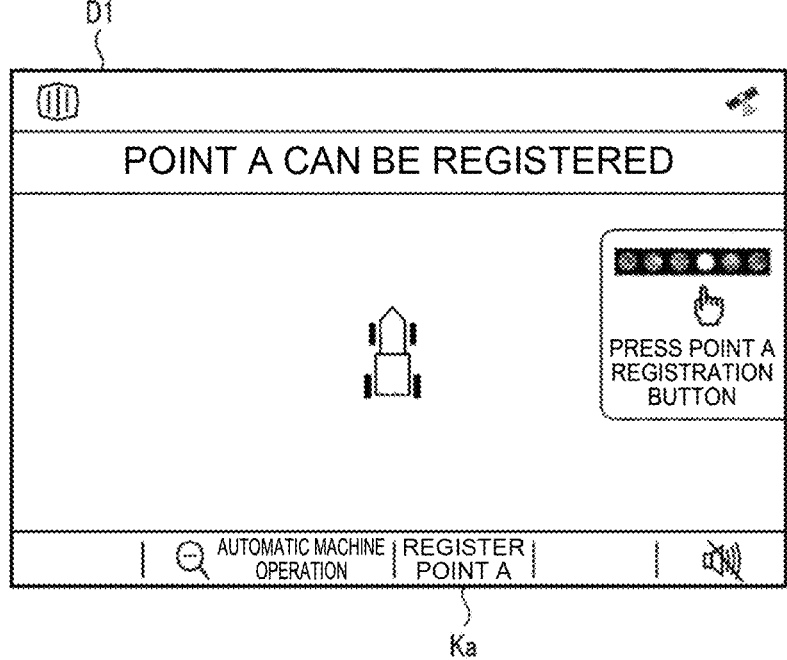
FIG. 8A is a diagram illustrating an example of an operation screen displayed on the operation device according to the embodiment of the present invention.
Figure 8B:
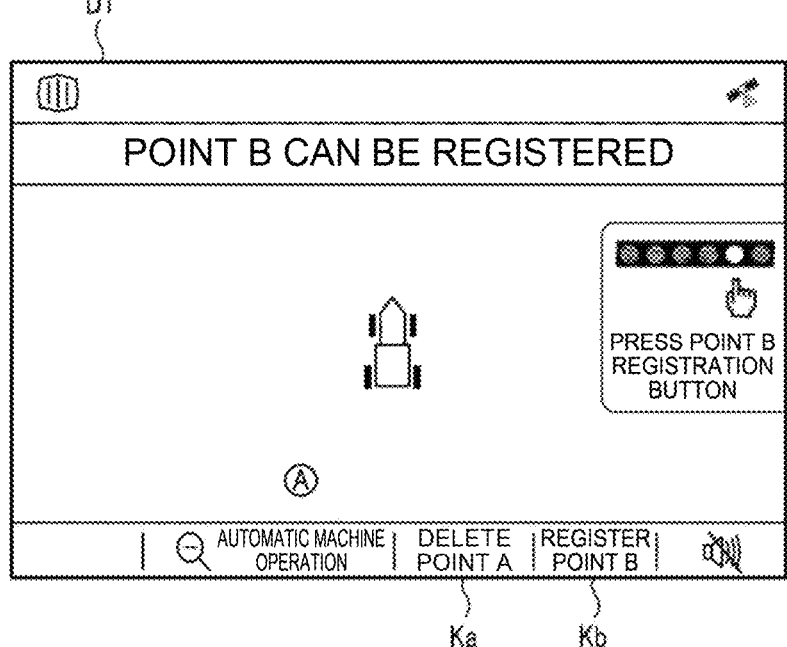
FIG. 8B is a diagram illustrating an example of an operation screen displayed on the operation device according to the embodiment of the present invention.

The setting screen P4 (lap width setting screen) illustrated in FIG. 7 includes an input column for inputting a lap width. On the setting screen P4, the operator inputs a width in which adjacent work-completed areas overlap each other (here, "+10 cm"). Note that a negative numerical value is input when it is desired to form a gap between the adjacent work-completed areas. In the example illustrated in FIGS. 6 and 7, since the work width is set to "180 cm" and the lap width is set to "+10 cm", a work interval (work pitch) between the work routes adjacent to each other is set to "170 cm" (see FIG. 11).

The generation processing unit 713 generates the target route R1 which includes the reference line L1 that is set in response to the operator's setting operation. For example, the generation processing unit 713 generates the target route R1 including a plurality of straight routes (work routes) arranged at a predetermined interval (equal interval) based on the reference line L1 passing through the point A (first reference point) and the point B (second reference point) in the field F. The generation processing unit 713 is an example of the generation processing unit of the present invention.

Hereinafter, an example of a procedure of generating the target route R1 will be described. For example, the display processing unit 711 causes the operation display unit 73 to display the operation screen D1 (see FIG. 8A) on which the setting operation from the operator to set the reference line L1 is accepted. The operator moves the work vehicle 10 to a desired location in the field F and presses a point A registration button Ka. For example, the operator moves the work vehicle 10 to an outer peripheral end portion of the field F and presses the point A registration button Ka. When the operator presses the point A registration button Ka, the generation processing unit 713 registers the current position of the work vehicle 10 as the first reference point (point A). When the generation processing unit 713 registers the point A, the display processing unit 711 causes the operation display unit 73 to display the operation screen D1 (see FIG. 8B), on which the registration operation of the second reference point (point B) is accepted. The operator causes the work vehicle 10 to manually travel in a direction (target direction) in which the work vehicle 10 is desired to travel and work (see FIG. 9A). Specifically, the operator causes the work vehicle 10 to travel straight in a direction parallel to a work direction (for example, cultivation direction) when the work vehicle 10 is working in the work area. At this time, the work vehicle 10 may perform predetermined work (for example, cultivation work) while traveling manually. Then, the operator presses a point B registration button Kb (see FIG. 8B) at another desired location (for example, an outer peripheral end portion of the field F). When the operator presses the point B registration button Kb, the generation processing unit 713 registers the current position of the work vehicle 10 as the second reference point (point B).

Figure 9A:
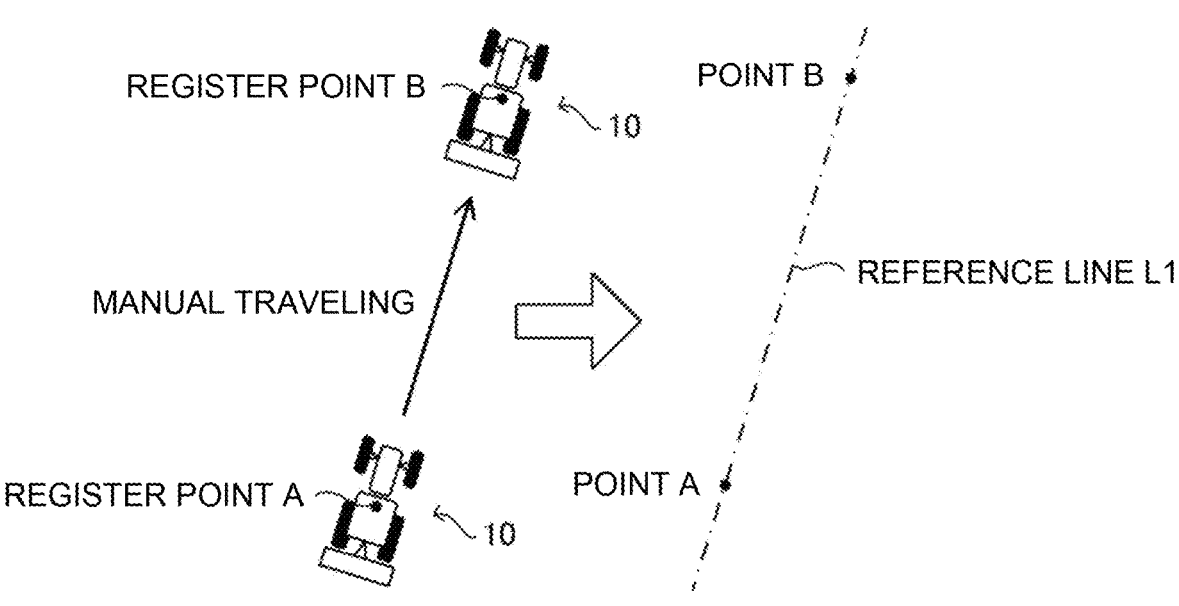
FIG. 9A is a diagram to explain a method of generating a route according to the embodiment of the present invention.

When the generation processing unit 713 obtains position information of the point A and the point B, a straight line passing through the point A and the point B is set as the reference line L1 (see FIG. 9A). Note that the generation processing unit 713 may be able to adjust the orientation of the created reference line L1. For example, the generation processing unit 713 causes the operation screen D1 to display the created reference line L1, and sets (registers) the reference line L1 when the registration operation from the operator is accepted. On the other hand, when the generation processing unit 713 accepts an operation (for example, a screen touch operation or the like) from the operator to change the orientation of the reference line L1, the orientation of the reference line L1 is adjusted in response to the operation. When the operation to register the point B is accepted, the generation processing unit 713 may cause a selection screen for registering or adjusting the reference line L1 to be displayed.

Figure 9B:
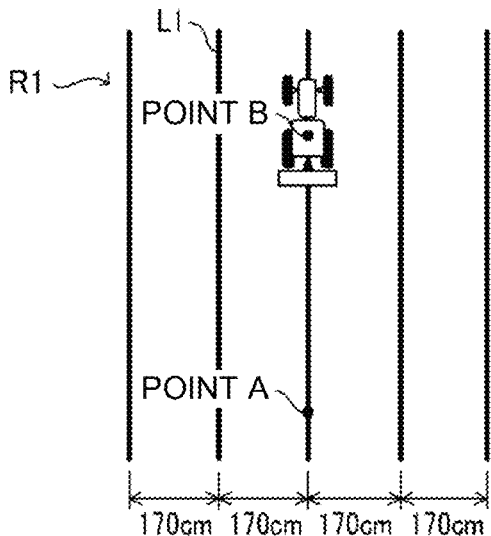
FIG. 9B is a diagram to explain a method of generating a route according to the embodiment of the present invention.
Figure 9C:
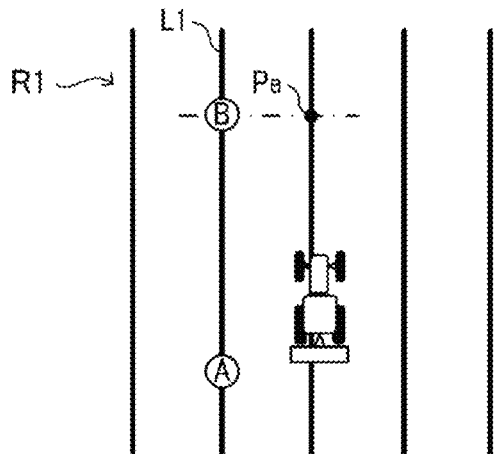
FIG. 9C is a diagram to explain a method of generating a route according to the embodiment of the present invention.

The generation processing unit 713 generates a travel route (the target route R1) that includes the reference line L1 and a plurality of straight lines parallel to the reference line L1. For example, the generation processing unit 713 generates, with reference to the reference line L1, a plurality of parallel straight lines at an equal interval (here, interval of "170 cm") based on a work width (lateral width of the work machine 14) and a lap width (a width in which adjacent work-completed areas overlap each other) set in advance (see FIG. 9B). The generation processing unit 713 registers the generated target route R1 in the storage unit 72 and causes the operation display unit 73 to display the generated target route R1.

According to the method described above, the target route R1 can be generated by the reference line L1 passing through two points (point A and point B) at both end portions of the field F, thus improving the accuracy of work by the work vehicle 10. Note that the generation processing unit 713 may be able to register the point B in the case where the work vehicle travels for a predetermined distance (for example, 5 m) after the point A is registered. In this way, a more accurate reference line L1 can be set.

After the target route R1 is generated, the operator gives an instruction (travel start instruction) to cause the work vehicle to start automatic traveling in the field F. For example, when the work vehicle 10 is located within a predetermined distance from the target route R1 and within a predetermined orientation relative to the target route R1 (see FIG. 9C), and the automatic traveling start condition is satisfied and automatic traveling is possible, the operator can press the automatic traveling button (not illustrated) on the operation display unit 73 to give the travel start instruction.

Figure 11:
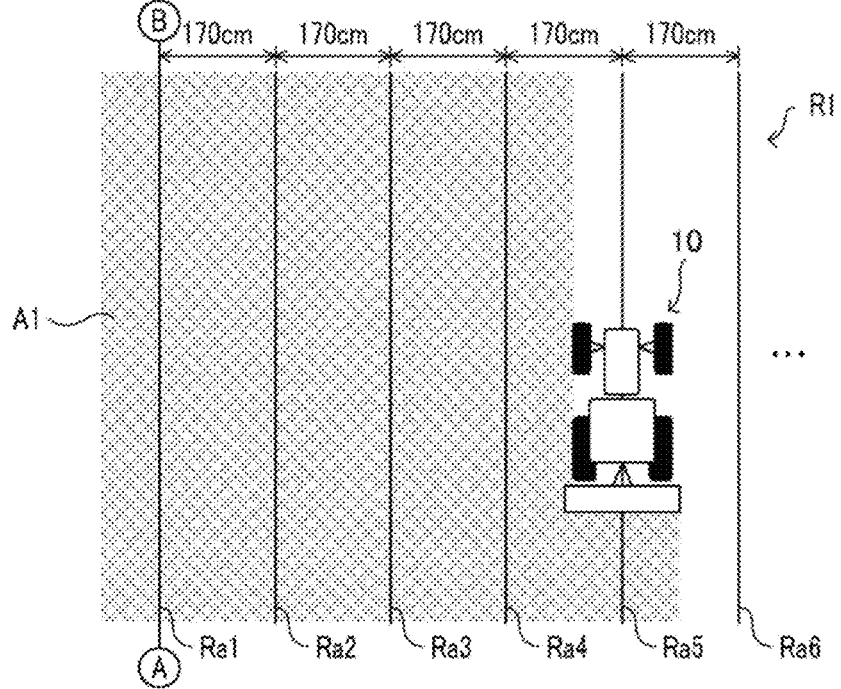
FIG. 11 is a diagram illustrating an example of a target route according to the embodiment of the present invention.

When the operator gives the travel start instruction, the vehicle control device 11 accepts the travel start instruction and starts automatic steering of the work vehicle 10 so that the work vehicle 10 follows the target route R1. As illustrated in FIG. 10, the work vehicle 10 executes a predetermined work while automatically traveling along a plurality of work routes included in the target route R1, and switches to manual traveling at the end of each work route to travel while turning on a turning route by manual steering performed by the operator. In the present embodiment, as illustrated in FIG. 11, the work vehicle 10 performs work while traveling back and forth along the plurality of work routes at 170 cm intervals.

Here, after the automatic traveling of the work vehicle is started, setting information related to the automatic traveling may be changed. For example, when the overlap amount between the adjacent work-completed areas is not in a state intended by the operator, the operator may change the lap width set in advance (see FIG. 7). In addition, for example, when the interval between the work routes is not an interval intended by the operator, the operator may change the work width set in advance. For example, the operator performs an operation of changing the work width, the lap width, and the like displayed on the travel screen D2 illustrated in FIG. 12. For example, the operator changes the work width and the lap width by selecting display columns G1 and G2.

Figure 13:
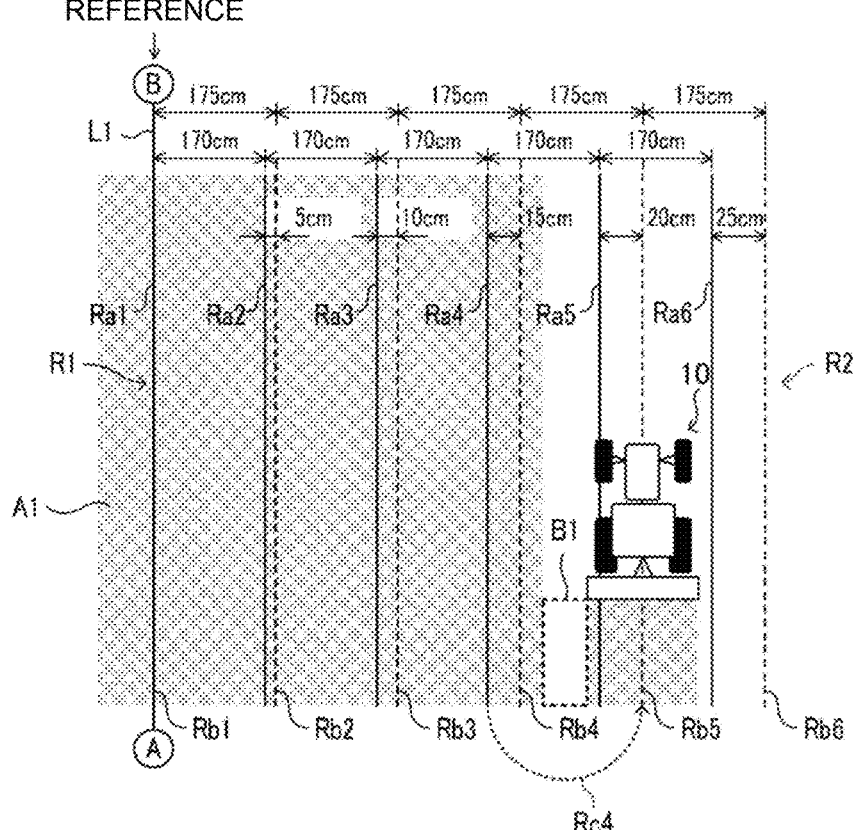
FIG. 13 is a diagram illustrating an example of a conventional method of changing a target route.

When the setting information related to the automatic traveling such as the work width and the lap width is changed, the target route is regenerated. In this case, in the conventional technique, since the target route is regenerated based on the reference line L1, there is a problem in that an unworked area is generated between a work area worked in accordance with the target route R1 generated in advance and a work area worked in accordance with the regenerated target route R2, or an overlap amount between both work areas becomes larger than the set and changed lap width. For example, when the operator changes the lap width from "+10 cm" to "+5 cm", the work interval (work pitch) of the work route is changed to "175 cm". In this case, in the conventional technique, as illustrated in FIG. 13, the target route R2 (a route indicated by a dotted line in FIG. 13) including a plurality of work routes Rb1 to Rb6 at 175 cm intervals is generated with reference to the reference line L1 (work route Ra1).

For example, in a case where the operator changes the lap width to "+5 cm" after the work vehicle 10 automatically travels along a work route Ra4, the work vehicle 10 manually travels along a turning route Rc4 and then automatically travels along a work route Rb5. In this case, the interval between a work route Ra5 of the original target route R1 and the work route Rb5 of the changed target route R2 becomes 20 cm, which is larger than a deviation amount ("5 cm") intended by the operator. Therefore, although the operator wants to set the overlap amount to 5 cm, an unworked area B1 of substantially 10 cm is actually generated.

When the operator changes the work width, the interval of the work route (work interval) is also changed, and thus the same problem occurs. As described above, in the conventional technique, there is a problem that the automatic traveling of the work vehicle is not appropriately executed when the setting information related to the automatic traveling is changed. In contrast, as described below, the automatic traveling system according to the present embodiment has a configuration capable of causing the work vehicle to automatically travel in an appropriate manner even when the setting information related to automatic traveling is changed.

To be specific, in a case where the setting information related to the automatic traveling is changed after the automatic traveling corresponding to the target route R1 set in advance is started, the change processing unit 714 generates the target route R2 with reference to the work-completed route along which the work vehicle 10 has performed work immediately before. That is, in a case where the setting information is changed after the automatic traveling corresponding to the target route R1 set in advance is started, the change processing unit 714 changes the target route R1 with reference to the work-completed route along which work is performed immediately before a time point at which the change operation is accepted. For example, the operator performs the operation of changing the setting information when the work vehicle 10 reaches the end of the work route and temporarily stops.

For example, the generation processing unit 713 generates the target route R1 including a plurality of work routes arranged at predetermined intervals based on setting information set in advance. Further, in a case where the setting information is changed after the work vehicle 10 starts automatic traveling corresponding to the target route R1, the change processing unit 714 generates the target route R2 with reference to a work-completed route which is a straight route immediately before a turning route along which the work vehicle 10 has traveled immediately before the current position. In addition, in a case where the setting information is changed after the work vehicle 10 starts automatic traveling corresponding to the target route R1, the change processing unit 714 generates the target route R2 with reference to a work-completed route which is a work route along which the work vehicle 10 has performed work immediately before among the plurality of work routes.

The vehicle control device 11 causes the work vehicle 10 to automatically travel in accordance with the target route R1, and causes the work vehicle 10 to automatically travel in accordance with the target route R2 when the setting information is changed.

Here, the setting information includes a work interval between the work routes adjacent to each other. In this case, the change processing unit 714 generates, in a case where the work interval is changed after the work vehicle 10 starts automatic traveling corresponding to the target route R1, the target route R2 in which a plurality of work routes are arranged at the changed work interval with reference to the work-completed route.

For example, the setting information includes at least one of a work width or a lap width. In this case, the change processing unit 714 generates, in a case where an operation of changing at least one of the work width or the lap width is accepted after the work vehicle 10 starts automatic traveling corresponding to the target route R1, the target route R2 based on at least one of the changed work width or the changed lap width with reference to the work-completed route.

Figure 14:
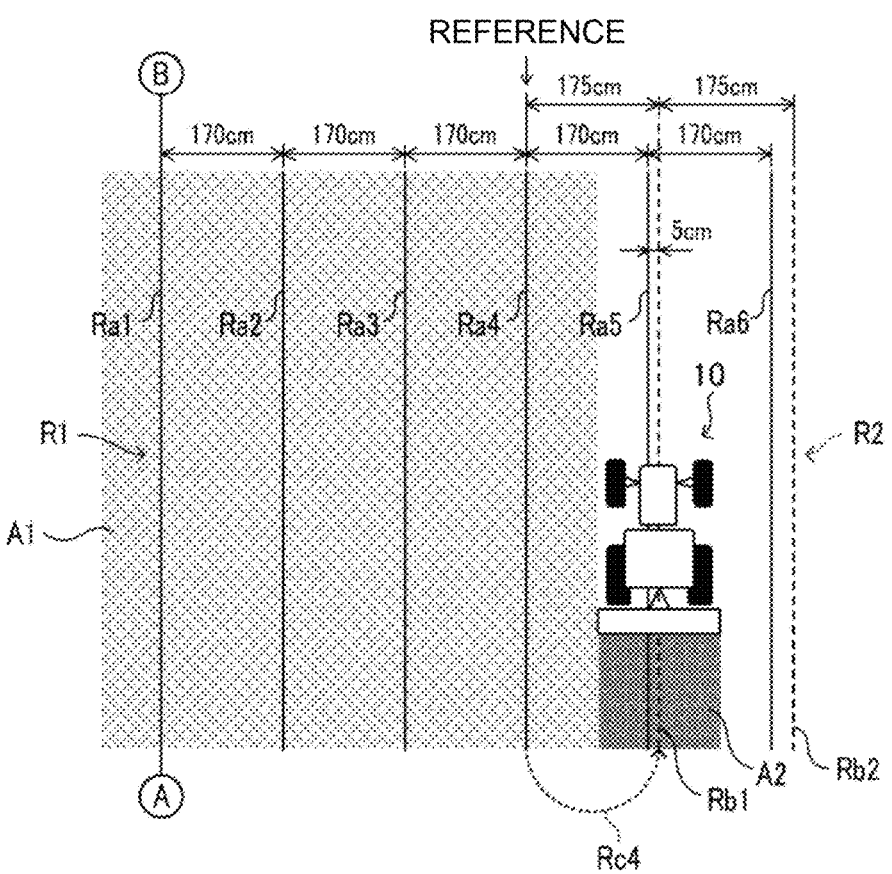
FIG. 14 is a diagram illustrating an example of a method of changing a target route according to the embodiment of the present invention.

For example, as illustrated in FIG. 14, in a case where the operator changes the lap width to "+5 cm" after the work vehicle 10 automatically travels along the work route Ra4 included in the target route R1, the change processing unit 714 sets the work interval (work pitch) between the work routes adjacent to each other to "175 cm". In addition, the change processing unit 714 generates the target route R2 with reference to the work route Ra4 (work-completed route) along which the work vehicle 10 has performed the work immediately before (lastly) among the plurality of work routes Ra1 to Ra6. In other words, the change processing unit 714 generates the target route R2 with reference to the work route Ra4 immediately before the work route Ra5 or the work route Ra4 adjacent to the work route Ra5 along which the work vehicle 10 performs the work next among the plurality of work routes Ra1 to Ra6. For example, as illustrated in FIG. 14, the change processing unit 714 generates the target route R2 including a plurality of work routes Rb1, Rb2, . . . arranged at an interval of "175 cm" from the work route Ra4.

When the setting information is changed, the vehicle control device 11 causes the work vehicle 10 to automatically travel on the work routes Rb1, Rb2, . . . in accordance with the target route R2 (see FIG. 14).

According to the example illustrated in FIG. 14, the interval between the work route Ra5 of the original target route R1 and the work route Rb1 of the changed target route R2 is 5 cm, which coincides with the deviation amount ("5 cm") intended by the operator. That is, the actual lap width coincides with the set lap width. Therefore, it is possible to prevent an occurrence of a situation that is not intended by the operator, such as an occurrence of an unworked area B1 (see FIG. 13).

Here, the display processing unit 711 may display the target route R2 on the operation display unit 73. For example, the display processing unit 711 causes the operation display unit 73 to display the target route R1 and the target route R2 illustrated in FIG. 14. Further, the display processing unit 711 may display the target route R1 and the target route R2 in display modes different from each other. Accordingly, the operator can check, before restarting the automatic traveling, the changed target route R2 or compare the target route R1 before the change with the changed target route R2.

Figure 12:
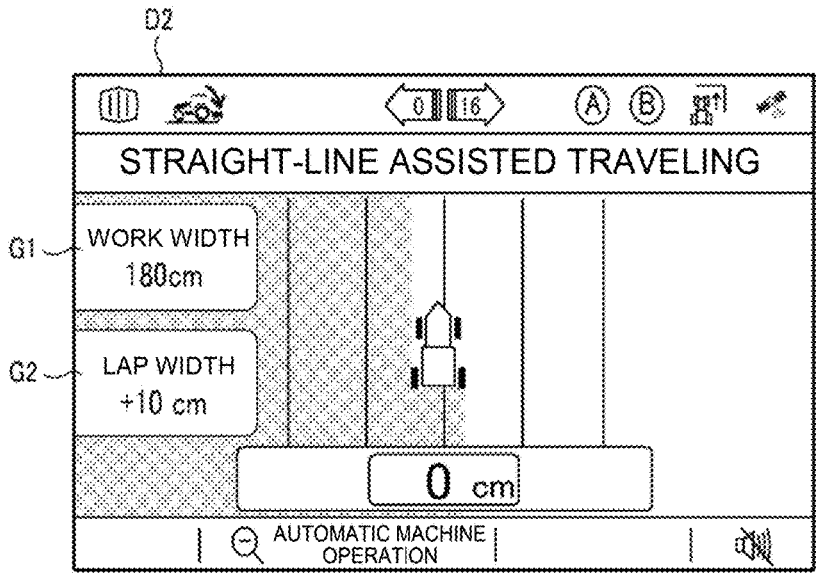
FIG. 12 is a diagram illustrating an example of a travel screen displayed on the operation device according to the embodiment of the present invention.

In addition, the display processing unit 711 may display a work trajectory (work-completed area A1) (an example of a first work trajectory of the present invention) when the work vehicle 10 travels in accordance with the target route R1 (see FIGS. 12 and 14). Further, the display processing unit 711 may display, in a display mode different from that of the work-completed area A1, a work trajectory (work-completed area A2) (an example of a second work trajectory of the present invention) when the work vehicle 10 travels in accordance with the target route R2 (see FIG. 14). Accordingly, the operator can check the range in which the work is completed, and can compare the work-completed area A1 before the target route is changed with the work-completed area A2 after the target route is changed. Moreover, it is possible to check the degree of overlap (overlap amount) between the work-completed area A1 and the work-completed area A2.

[Automatic Traveling Process]

Figure 15:
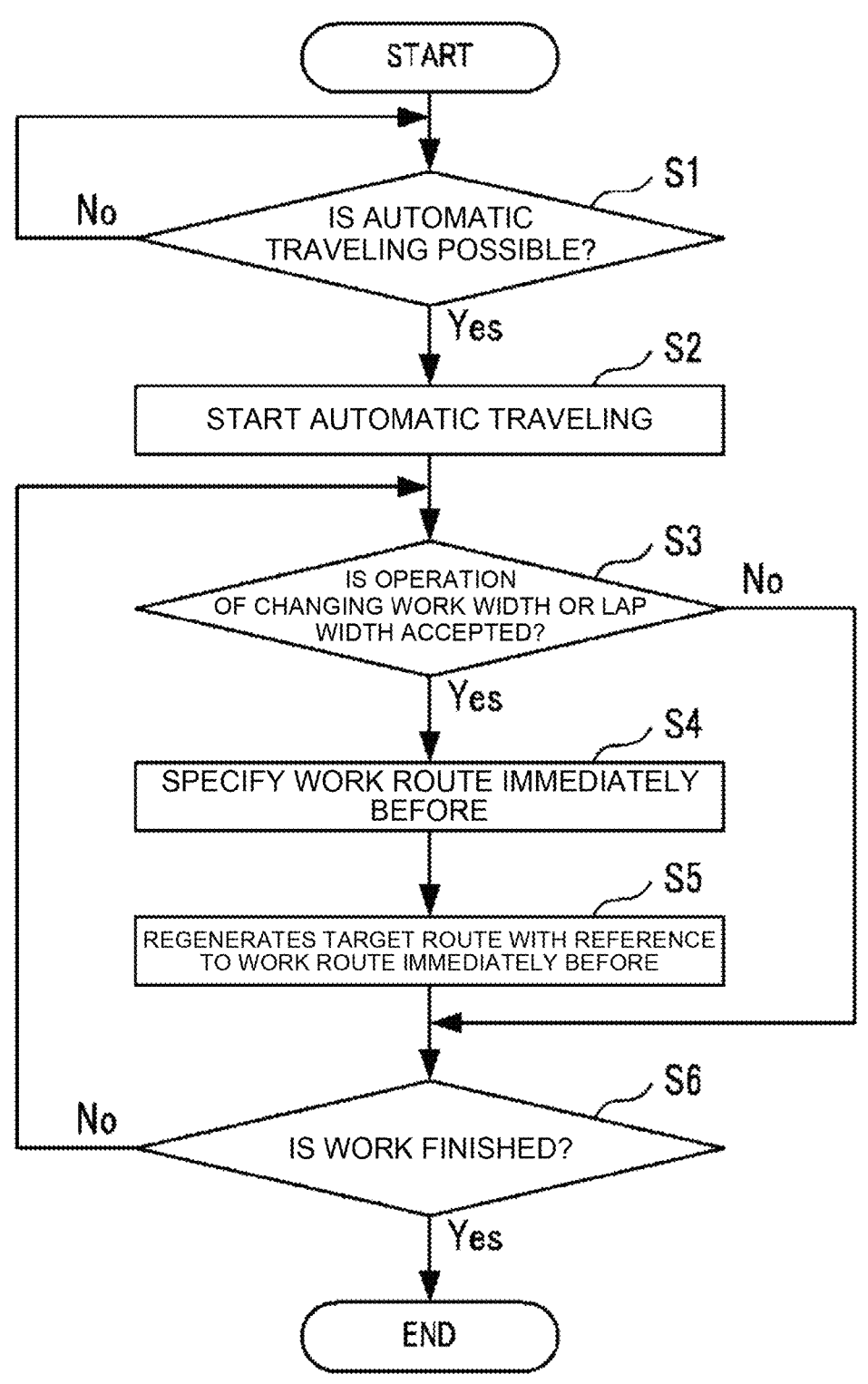
FIG. 15 is a flowchart illustrating an example of a procedure of an automatic traveling process executed by the work vehicle according to the embodiment of the present invention.

Hereinafter, an example of the automatic traveling process executed by the vehicle control device 11 and operation control unit 71 of the operation device 17 will be described with reference to FIG. 15. Note that the present invention may be viewed as an invention of an automatic traveling method in which the vehicle control device 11 and the operation device 17 execute part or all of the automatic traveling process, or as an invention of an automatic traveling program with the purpose of causing the vehicle control device 11 and the operation device 17 to execute part or all of the automatic traveling method.

In step S1, the vehicle control device 11 determines whether or not the work vehicle 10 is in a state where automatic traveling is possible. When the vehicle control device 11 determines that the work vehicle 10 is in a state where automatic traveling is possible (S1: Yes), the process proceeds to step S2. The vehicle control device 11 is on standby until the work vehicle 10 is in a state where automatic traveling is possible (S1: No). Specifically, when the work vehicle 10 satisfies the automatic traveling start condition, the vehicle control device 11 determines that the work vehicle 10 is in a state where automatic traveling is possible.

In step S2, the vehicle control device 11 causes the work vehicle 10 to start automatic traveling in accordance with the target route R1. Specifically, when the work vehicle 10 satisfies the automatic traveling start condition and the operator gives the travel start instruction, the vehicle control device 11 starts automatic traveling process corresponding to the target route R1 set in advance (see FIG. 14). For example, the vehicle control device 11 causes the work vehicle 10 to automatically travel by automatic steering in accordance with a work route (straight route). Further, the vehicle control device 11 also causes the work vehicle 10 to travel while turning in response to the operator's manual steering on turning route. The vehicle control device 11 causes the work vehicle 10 to travel in the field F while switching between automatic traveling along work routes and manual traveling along turning routes. Further, the vehicle control device 11 also drives the work machine 14 to execute a predetermined work (for example, cultivation work) while the work vehicle 10 is traveling automatically on a work route.

Next, in step S3, the operation control unit 71 determines whether or not a change operation of changing at least one of the work width or the lap width is accepted from the operator. When the operation control unit 71 accepts the change operation from the operator (S3: Yes), the process proceeds to step S4. On the other hand, when the operation control unit 71 does not accept the change operation from the operator (S3: No), the process proceeds to step S6. For example, in a case where the operator performs an operation of changing the lap width on the travel screen D2 (see FIG. 12) after the work vehicle 10 starts automatic traveling, the operation control unit 71 accepts the change operation (S3: Yes), and the process proceeds to step S4.

In step S4, the operation control unit 71 specifies a work route serving as a reference for generating the target route R2. For example, in the example illustrated in FIG. 14, the operation control unit 71 specifies, as the reference work route, the work route Ra4 along which the work vehicle 10 has performed work immediately before (lastly) the time point at which the change operation is accepted, among the plurality of work routes Ra1 to Ra6 included in the target route R1.

Next, in step S5, the operation control unit 71 generates a target route R2 with reference to the work route (work-completed route) specified in step S4. Here, the operation control unit 71 generates the target route R2 with reference to the work route Ra4. For example, the operation control unit 71 generates the target route R2 including the plurality of work routes Rb1, Rb2, . . . arranged at a work interval set based on the lap width changed by the operator (see FIG. 14). In this way, in a case where the operation control unit 71 accepts an operation of changing the setting information such as the work width and the lap width from the operator after the work vehicle starts automatic traveling, the operation control unit 71 executes a process of changing the target route R1 set before the work vehicle 10 starts automatic traveling (target route regeneration process).

Next, in step S6, the vehicle control device 11 determines whether or not the work vehicle 10 finishes the work. When the vehicle control device 11 determines that the work vehicle 10 finishes the work (S6: Yes), the vehicle control device 11 ends the automatic traveling process. When the vehicle control device 11 determines that the work vehicle 10 does not finish the work (S6: No), the vehicle control device 11 causes the work vehicle 10 to continue traveling automatically in accordance with the target route (the target route R1 or the target route R2), and the process proceeds to step S3.

The vehicle control device 11 and the operation control unit 71 repeatedly execute the processes of steps S3 to S5 described above until the work vehicle 10 finishes the work.

As mentioned above, the vehicle control device 11 and the operation control unit 71 execute the automatic traveling process.

As described above, the work vehicle 10 according to the present embodiment causes the work vehicle 10 to automatically travel in accordance with the target route R1 set in advance, and generates, in a case where setting information related to automatic traveling is changed after the work vehicle 10 starts automatic traveling corresponding to the target route R1, the target route R2 with reference to the work-completed route along which the work vehicle 10 has performed work immediately before, and causes the work vehicle 10 to automatically travel in accordance with the target route R2.

According to the above-described configuration, even in a case where the setting information such as the work width and the lap width is changed after the work vehicle 10 starts automatic traveling in accordance with the target route R1 set in advance, it is possible to appropriately execute the automatic traveling corresponding to the setting information. For this reason, for example, it is possible to prevent an unworked area (see FIG. 13) from being generated, and to prevent the overlap amount between both work areas from being in an unintended state. Therefore, even when the setting information related to the automatic traveling is changed, it is possible to cause the work vehicle 10 to automatically travel in an appropriate manner.

Other Embodiments

The present invention is not limited to the embodiment described above. Other embodiments of the present invention are described as follows.

The setting information of the present invention is not limited to the work width and the lap width described above, and may be information on a generation mode of generating a target route. For example, the setting information may include a work width reference mode (see FIG. 5A) (an example of a first generation mode of the present invention) of generating a target route including a plurality of work routes arranged at a predetermined interval based on the reference line L1 set in advance, and an own vehicle position reference mode (see FIG. 5B) (an example of a second generation mode of the present invention) of generating a target route with reference to a current position of the work vehicle 10. In the own vehicle position reference mode, a straight route passing through the current position of the work vehicle and parallel to the reference line L1 is generated as a target route.

For example, in a case where the operator selects the own vehicle position reference mode and the generation processing unit 713 generates the target route R1 in the own vehicle position reference mode, the vehicle control device 11 causes the work vehicle 10 to automatically travel in accordance with the target route R1 corresponding to the own vehicle position reference mode. For example, when the operator positions the work vehicle 10 at a work start position and causes the work vehicle 10 to start automatic traveling, the vehicle control device 11 causes the work vehicle 10 to automatically travel in accordance with the work route (target route R1) that passes through the work start position and is parallel to the reference line L1. When the automatic traveling and the work of one work route are finished, the operator causes the work vehicle 10 to manually travel and position the work vehicle 10 at the work start position of the next work route, and then causes the work vehicle 10 to start automatic traveling again in accordance with the work route (target route R1) that passes through the work start position and is parallel to the reference line L1. As described above, in the own vehicle position reference mode, the vehicle control device 11 causes the work vehicle 10 to automatically travel based on the current position of the work vehicle 10, which is positioned by the operator for each work route.

Here, in a case where the work vehicle 10 is changed into the work width reference mode after starting the automatic traveling in accordance with the target route R1 generated in the own vehicle position reference mode, the above-mentioned unworked area B1 may occur. For example, in the example illustrated in FIG. 16, the work routes Ra1 to Ra4 (target route R1) along which the work vehicle 10 traveled in the own vehicle position reference mode are illustrated. Here, in a case where the operator changes the mode to the work width reference mode after the work vehicle 10 automatically travels along the work route Ra4, the work vehicle 10 automatically travels in accordance with the target route R2 including the plurality of work routes Rb1 to Rb6 arranged at a work interval (for example, "170 cm") corresponding to the work width (for example, "180 cm") and the lap width (for example, "10 cm") with reference to the reference line L1. In this case, for example, when the work route Ra4 (work-completed route)) of the target route R1 and the work route Rb4 of the target route R2 are misaligned, the work is not started from the position intended by the operator in the work route Rb5 next to the work route Ra4, and the unworked area B1 is generated (see FIG. 16).

Therefore, in a case where the work vehicle 10 is changed into the work width reference mode after the work vehicle 10 starts automatic traveling in accordance with the target routes R1 generated in the own vehicle position reference mode, the change processing unit 714 generates the target routes R2 with reference to the work-completed routes along which the work vehicle 10 has performed the work immediately before. For example, as illustrated in FIG. 17, the change processing unit 714 generates the target route R2 including a plurality of work routes Rb1, Rb2, . . . arranged at the work interval (for example, "170 cm") with reference to the work route Ra4 along which the work vehicle 10 has performed the work immediately before.

Figure 16:
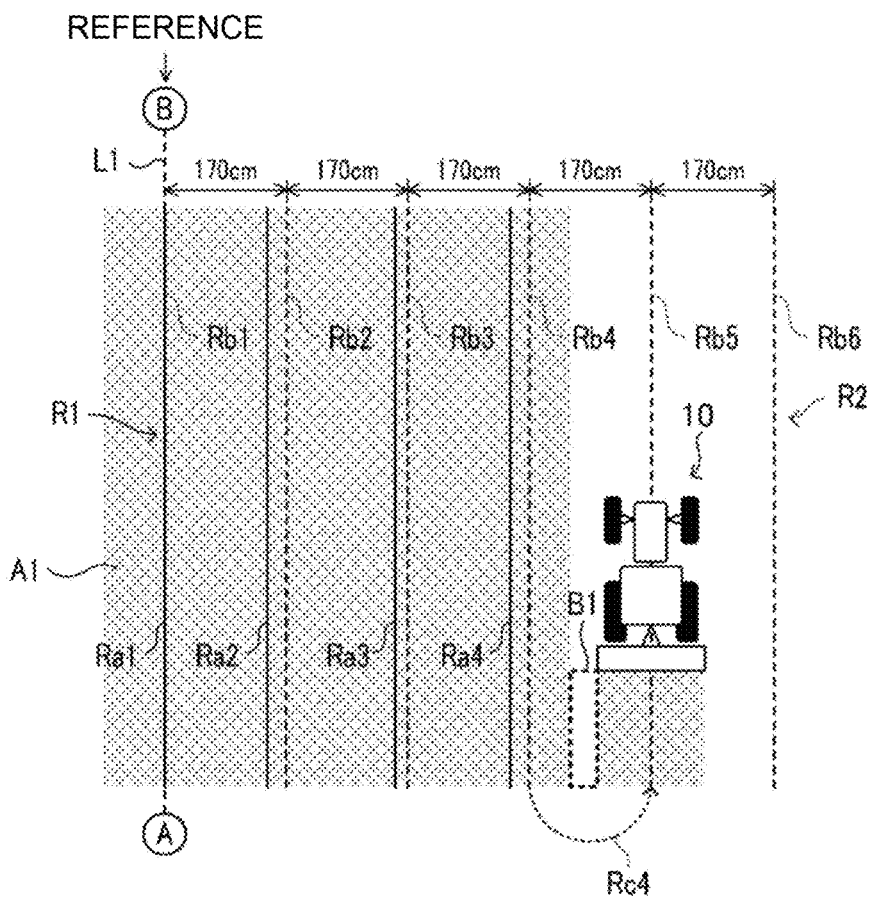
FIG. 16 is a diagram illustrating an example of a conventional method of changing a target route.

As a result, since the next work route Rb1 can be worked at the work interval (here, "170 cm") intended by the operator from the immediately previous work route Ra4, it is possible to prevent the occurrence of a situation unintended by the operator, such as the occurrence of the unworked area B1 (see FIG. 16). In addition, it is possible to cause the work vehicle 10 to automatically travel the subsequent work routes in accordance with the target route R2 corresponding to the work width reference mode.

Figure 17:
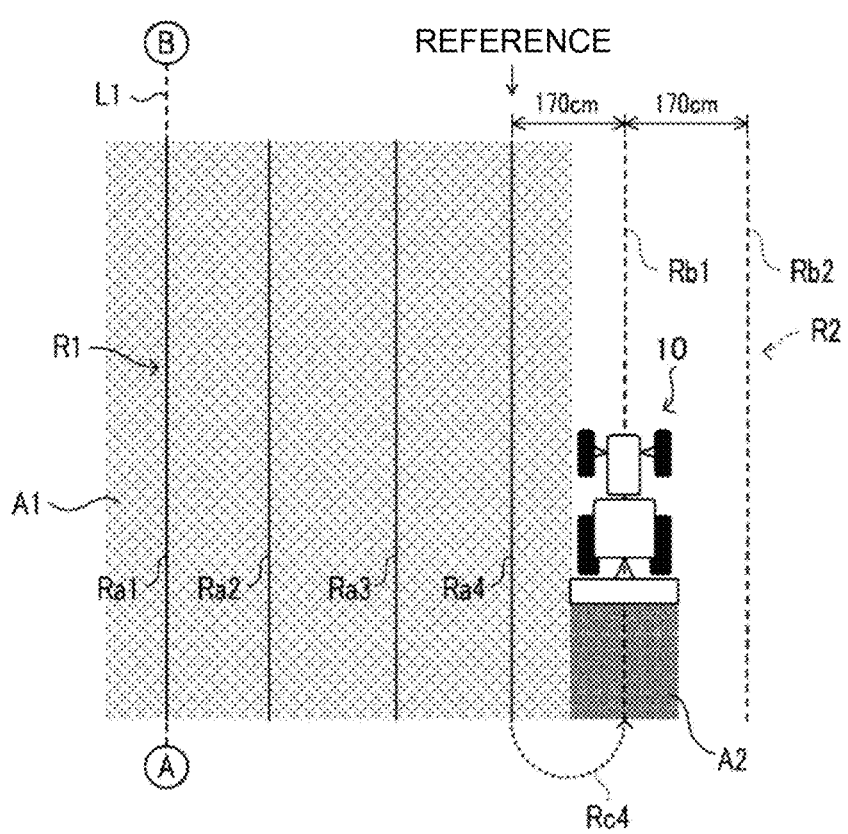
FIG. 17 is a diagram illustrating an example of a method of changing a target route according to another embodiment of the present invention.
Figure 18:
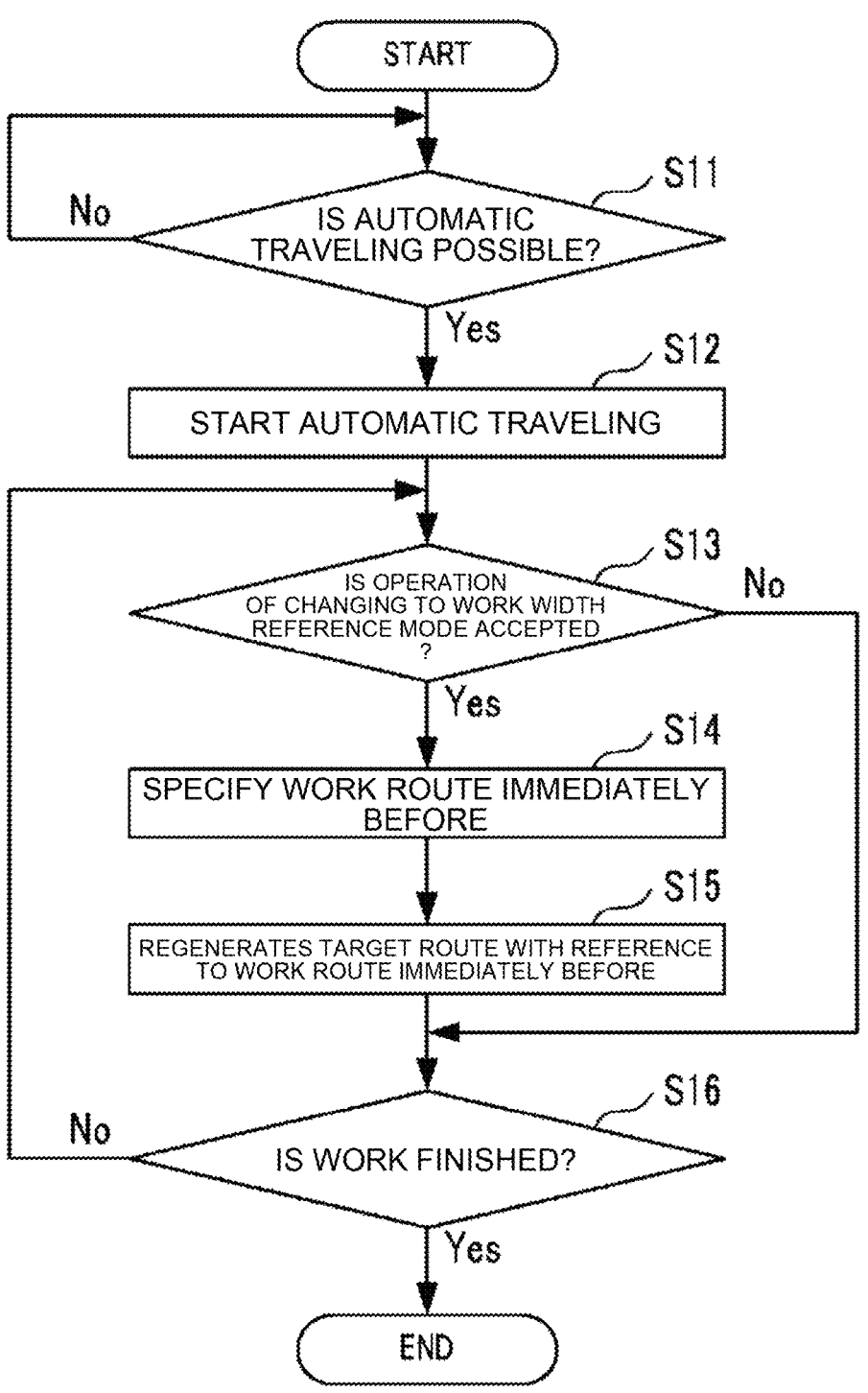
FIG. 18 is a flowchart illustrating an example of a procedure of an automatic traveling process executed by the work vehicle according to another embodiment of the present invention.

FIG. 18 illustrates an example of the automatic traveling process corresponding to FIG. 17. Hereinafter, description of the same processes as those of the automatic traveling process illustrated in FIG. 15 will be simplified or omitted as appropriate.

In step S11, the vehicle control device 11 determines whether or not the work vehicle 10 is in a state where automatic traveling is possible. When the vehicle control device 11 determines that the work vehicle 10 is in a state where automatic traveling is possible (S11: Yes), the process proceeds to step S12. The vehicle control device 11 is on standby until the work vehicle 10 is in a state where automatic traveling is possible (S11: No). Here, it is assumed that the own vehicle position reference mode is set and the target route R1 is generated in the own vehicle position reference mode.

In step S12, the vehicle control device 11 causes the work vehicle 10 to start automatic traveling in accordance with the target route R1. More specifically, when the work vehicle 10 satisfies the automatic traveling start condition and the operator gives the travel start instruction, the vehicle control device 11 starts automatic traveling process corresponding to the work route (target route R1) parallel to the reference line L1 with reference to the current position (own vehicle position) of the work vehicle 10.

Next, in step S13, the operation control unit 71 determines whether or not a change operation of changing to the work width reference mode from the operator is accepted. When the operation control unit 71 accepts the change operation from the operator (S13: Yes), the process proceeds to step S14. On the other hand, when the operation control unit 71 does not accept the change operation from the operator (S13: No), the process proceeds to step S16.

In step S14, the operation control unit 71 specifies a work route serving as a reference for generating the target route R2. For example, in the example illustrated in FIG. 17, the operation control unit 71 specifies, as the reference work route, the work route Ra4 along which the work vehicle 10 has performed the work immediately before (lastly) among the plurality of work routes Ra1 to Ra4 (target route R1).

Next, in step S15, the operation control unit 71 generates the target route R2 with reference to the work route specified in step S14. Here, the operation control unit 71 generates the target route R2 with reference to the work route Ra4. For example, the operation control unit 71 generates the target route R2 including the plurality of work routes Rb1, Rb2, . . . arranged at the work interval set based on the work width and the lap width set by the operator with reference to the work route Ra4 (see FIG. 17).

Next, in step S16, the vehicle control device 11 determines whether or not the work vehicle 10 finishes the work. When the vehicle control device 11 determines that the work vehicle 10 finishes the work (S16: Yes), the vehicle control device 11 ends the automatic traveling process. When the vehicle control device 11 determines that the work vehicle 10 does not finish the work (S16: No), the vehicle control device 11 causes the work vehicle 10 to continue traveling automatically in accordance with the target route (the target route R1 or the target route R2), and the process proceeds to step S13.

The vehicle control device 11 and the operation control unit 71 repeatedly execute the processes of steps S13 to S15 described above until the work vehicle 10 finishes the work.

As described above, in a case where the setting information (work width, lap width, generation mode of generating the target route, and the like) related to automatic traveling is changed after the work vehicle 10 starts automatic traveling corresponding to the target route R1, the vehicle control device 11 and the operation control unit 71 generate the target route R2 with reference to the work-completed route along which the work vehicle 10 has performed work immediately before and cause the work vehicle 10 to automatically travel in accordance with the target route R2.

Figure 19:
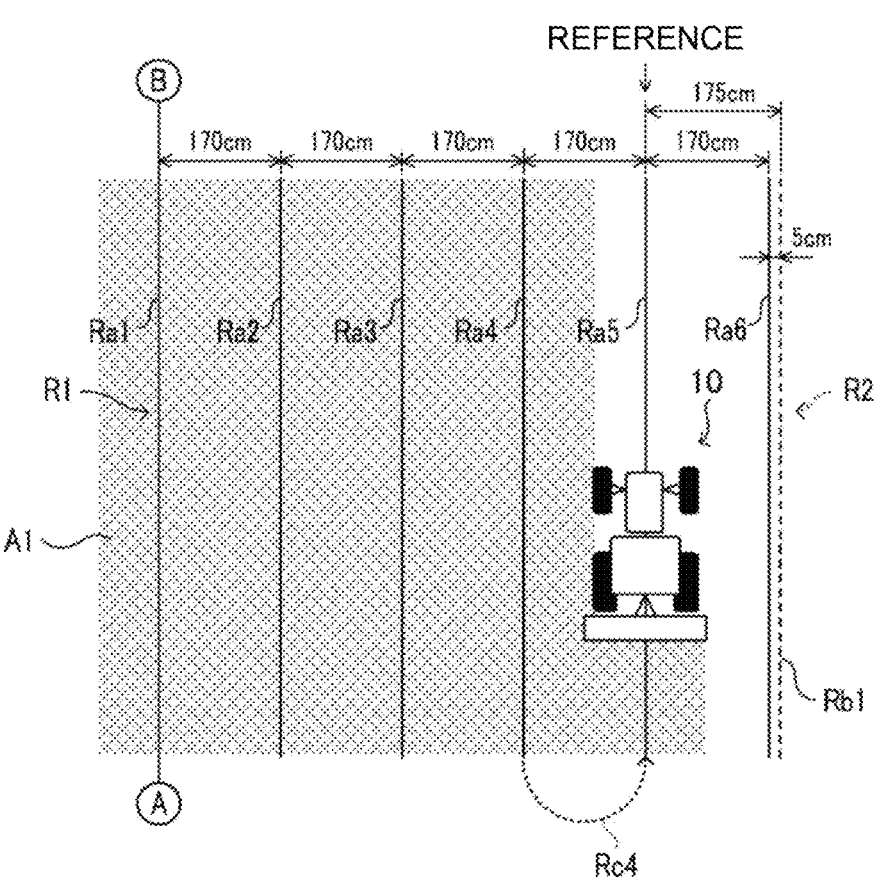
FIG. 19 is a diagram illustrating an example of a method of changing a target route according to another embodiment of the present invention.

Further, as another embodiment of the present invention, the work route serving as a reference for generating the target route R2 may be a route along which the work vehicle 10 is currently working. For example, as illustrated in FIG. 19, when the operator performs an operation of changing the setting information (for example, the lap width) while the work vehicle is automatically traveling along the work route Ra5 of the target route R1, the change processing unit 714 may generate the target route R2 with reference to the work route Ra5. In this case, the vehicle control device 11 causes automatic traveling corresponding to the target route R2 to be executed on and after a next work route of the work route Ra5. That is, the "work-completed route along which the work vehicle has performed work immediately before" of the present invention includes the work route (work route Ra4 in FIG. 14) immediately before the turning route immediately before the current position of the work vehicle 10, and the work route (work route Ra5 in FIG. 19) immediately before the current position of the work vehicle 10.

Further, as another embodiment of the present invention, in a case where the setting information is changed in the middle of the work route Ra5 of the target route R1, the vehicle control device 11 may cause the work vehicle 10 to automatically travel in accordance with the target route R2 from the middle of the work route Ra5. For example, in a case where the setting information is changed in the middle of the work route Ra5 of the target route R1 and the change processing unit 714 generates the target route R2 with reference to the work route Ra4, the vehicle control device 11 may cause the vehicle to automatically travel in accordance with the target route R2 from the position at which the operation of changing the setting information is accepted in the work route Ra5.

Further, as another embodiment of the present invention, when the setting information is changed in the middle of the work route of the target route R1, the operation control unit 71 may be configured such that the operator can select whether to start the automatic traveling corresponding to the changed target route R2 from the middle of the work route or to start the automatic traveling corresponding to the changed target route R2 from a next work route of the work route. For example, in a case where the operation control unit 71 accepts an operation of changing the setting information in the middle of the work route of the target route R1, the operation control unit 71 causes the operation display unit 73 to display a work route for starting automatic traveling corresponding to the target route R2 in a selectable manner. Note that the configuration in which the operator is caused to select the position at which the automatic traveling corresponding to the target route R2 is started can also be applied to a case where the operation of changing the setting information from the operator is accepted while the work vehicle is temporarily stopped between the work routes (at the terminal position of the work route or the like).

According to the above-described configuration, the operator can appropriately set the position at which the changed target route R2 is reflected in accordance with the work content, the working condition, and the like, so that the operability can be improved.

Note that the work vehicle of the present invention may also be able to automatically travel when turning. Further, in the work vehicle 10, the operator may be able to switch between automatic traveling and manual traveling when turning. Furthermore, the work vehicle 10 may also be able to automatically travel along the target route unmanned. In this case, the operator may remotely control the operation terminal to give the travel start instruction or the like. The operation terminal that is used for the remote control may be the operation device 17 according to the present embodiment or may include each of the processing units in the operation device 17.

The automatic traveling system of the present invention may be constituted by the vehicle control device 11 and the operation device 17, or may be constituted by the vehicle control device 11 alone or the operation device 17 alone. Further, the automatic traveling system may be configured by a server including each of the processing units included in the vehicle control device 11 and the operation device 17.

SUPPLEMENTARY NOTES OF THE INVENTION

The following is a summary of the invention extracted from the embodiments. The components and processing functions described in the following supplementary notes can be selected and combined as desired.

<Supplementary Note 1>
An automatic traveling method, comprising:
causing a work vehicle to automatically travel in accordance with a first target route set in advance;
generating, in a case where setting information related to automatic traveling is changed after the work vehicle starts automatic traveling corresponding to the first target route, a second target route with reference to a work-completed route along which the work vehicle has performed work immediately before; and
causing the work vehicle to automatically travel in accordance with the second target route.

<Supplementary Note 2>
The automatic traveling method according to Supplementary Note 1, wherein
in a case where the setting information is changed after the work vehicle starts automatic traveling corresponding to the first target route, the second target route is generated with reference to the work-completed route that is a straight route immediately before a turning route along which the work vehicle has traveled immediately before a current position of the work vehicle.

<Supplementary Note 3>
The automatic traveling method according to Supplementary Note 1 or 2, wherein
the first target route including a plurality of work routes arranged at a predetermined interval is generated based on the setting information set in advance, and
in a case where the setting information is changed after the work vehicle starts automatic traveling corresponding to the first target route, the second target route is generated with reference to the work-completed route that is a work route along which the work vehicle has performed work immediately before among the plurality of work routes.

<Supplementary Note 4>
The automatic traveling method according to Supplementary Note 3, wherein
the setting information includes a work interval between the work routes adjacent to each other, and
in a case where the work interval is changed after the work vehicle starts automatic traveling corresponding to the first target route, the second target route in which the plurality of work routes are arranged at the changed work interval with reference to the work-completed route is generated.

<Supplementary Note 5>
The automatic traveling method according to Supplementary Note 3 or 4, wherein the setting information includes at least one of a work width that is a width of a work machine or a lap width that is a width in which adjacent work areas overlap each other, and in a case where an operation of changing at least one of the work width or the lap width is accepted after the work vehicle starts automatic traveling corresponding to the first target route, the second target route is generated based on at least one of the changed work width or the changed lap width with reference to the work-completed route.

<Supplementary Note 6>

The automatic traveling method according to any one of Supplementary Notes 1 to 5, wherein the setting information includes a first generation mode of generating a target route including a plurality of work routes arranged at a predetermined interval based on a reference line set in advance, and a second generation mode of generating a target route with reference to a current position of the work vehicle, and in a case where the work vehicle is changed into the first generation mode after the work vehicle starts automatic traveling in accordance with the first target route generated in the second generation mode, the second target route is generated with reference to the work-completed route.

<Supplementary Note 7>

The automatic traveling method according to any one of Supplementary Notes 1 to 6, wherein the second target route is displayed on an operation terminal.

<Supplementary Note 8>

The automatic traveling method according to any one of Supplementary Notes 1 to 7, wherein the first target route and the second target route are displayed on an operation terminal in display modes different from each other.

<Supplementary Note 9>

The automatic traveling method according to any one of Supplementary Notes 1 to 8, wherein a first work trajectory when the work vehicle travels in accordance with the first target route is displayed on an operation terminal.

<Supplementary Note 10>

The automatic traveling method according to Supplementary Note 9, wherein a second work trajectory when the work vehicle travels in accordance with the second target route is displayed on the operation terminal in a display mode different from that of the first work trajectory.

REFERENCE SIGNS LIST

10: Work vehicle
11: Vehicle control device (first travel processing unit, second travel processing unit)
12: Storage unit
13: Traveling device
14: Work machine
16: Positioning device
17: Operation device (operation terminal)
71: Operation control unit
72: Storage unit
73: Operation display unit
711: Display processing unit
712: Acceptance processing unit
713: Generation processing unit 714: Change processing unit
A1: Work-completed area (first work trajectory)
A2: Work-completed area (second work trajectory)
B1: Unworked area
F: Field
L1: Reference line
R1: Target route (first target route)
R2: Target route (second target route)
Ra1 To Ra12: Work routes (of target route r1)
Rb1 To Rb6: Work routes (of target route r2)

The invention claimed is:

1. An automatic traveling method, comprising:
causing a work vehicle to automatically travel in accordance with a first target route set in advance;
generating, in a case where setting information related to automatic traveling is changed after the work vehicle starts automatic traveling corresponding to the first target route, a second target route with reference to a work-completed route along which the work vehicle has performed work immediately before the setting information is changed, the second target route being different from a straight route currently being traveled by the work vehicle; and
causing the work vehicle to automatically travel in accordance with the second target route.

2. The automatic traveling method according to claim 1, wherein, in a case where the setting information is changed after the work vehicle starts automatic traveling corresponding to the first target route, the second target route is generated with reference to the work-completed route that is a straight route immediately before a turning route of the first target route along which the work vehicle has traveled immediately before a current position of the work vehicle.

3. The automatic traveling method according to claim 1, wherein:
the first target route including a plurality of work routes arranged at a predetermined interval is generated based on the setting information set in advance, and
in a case where the setting information is changed after the work vehicle starts automatic traveling corresponding to the first target route, the second target route is generated with reference to the work-completed route that is a work route along which the work vehicle has performed work immediately before among the plurality of work routes.

4. The automatic traveling method according to claim 3, wherein:
the setting information includes a work interval between the work routes adjacent to each other, and
in a case where the work interval is changed after the work vehicle starts automatic traveling corresponding to the first target route, the second target route in which the plurality of work routes are arranged at the changed work interval with reference to the work-completed route is generated.

5. The automatic traveling method according to claim 3, wherein:
the setting information includes at least one of a work width that is a width of a work machine or a lap width that is a width in which adjacent work areas overlap each other, and
in a case where an operation of changing at least one of the work width or the lap width is accepted after the work vehicle starts automatic traveling corresponding to the first target route, the second target route is generated based on at least one of the changed work width or the changed lap width with reference to the work-completed route.

6. The automatic traveling method according to claim 1, wherein:

the setting information includes:

a first generation mode of generating a target route including a plurality of work routes arranged at a predetermined interval based on a reference line set in advance, and a second generation mode of generating a target route with reference to a current position of the work vehicle, and after the work vehicle starts automatic traveling in accordance with the first target route generated in the second generation mode, if the second generation mode is changed to the first generation mode, the second target route is generated with reference to the work-completed route.

7. The automatic traveling method according to claim 1, wherein the second target route is displayed on an operation terminal.

8. The automatic traveling method according to claim 1, wherein the first target route and the second target route are displayed on an operation terminal in display modes different from each other.

9. The automatic traveling method according to claim 1, wherein a first work trajectory when the work vehicle travels in accordance with the first target route is displayed on an operation terminal.

10. The automatic traveling method according to claim 9, wherein a second work trajectory when the work vehicle travels in accordance with the second target route is displayed on the operation terminal in a display mode different from that of the first work trajectory.

11. The automatic traveling method according to claim 1, wherein the first target route is set in advance based on first setting information, and in the case where the first setting information is changed to second setting information, the second target route is generated based on the second setting information.

12. The automatic traveling method according to claim 1, wherein the work-completed route is immediately before the second target route.

13. The automatic traveling method according to claim 1, wherein the first target route includes a plurality of work routes arranged at a first interval from one another, the plurality of work routes including the work-completed route, and the second target route includes a second plurality of work routes arranged at a second interval from one another, the second interval being different than the first interval.

14. The automatic traveling method according to claim 13, wherein a spacing between a first work route of the first plurality of work routes and a second work route of the second plurality of work routes is set by the setting information that is changed.

15. The automatic traveling method according to claim 13, wherein the setting information includes at least one of a work width that is a width of a work machine or a lap width that is a width in which adjacent work areas overlap each other, and the second interval is based on at least one of a changed work width or a changed lap width.

16. An automatic traveling system comprising:

a first travel processing unit that is configured to cause a work vehicle to automatically travel in accordance with a first target route set in advance;

a generation processing unit that is configured to generate, in a case where setting information related to automatic traveling is changed after the work vehicle starts automatic traveling corresponding to the first target route, a second target route with reference to a work-completed route along which the work vehicle has performed work immediately before the setting information is changed, the second target route being different from a straight route currently being traveled by the work vehicle; and a second travel processing unit that is configured to cause the work vehicle to automatically travel in accordance with the second target route.

17. A non-transitory, computer-readable medium storing instructions, which when executed by one or more processors, causes the one or more processors to:

cause a work vehicle to automatically travel in accordance with a first target route set in advance;

generate, in a case where setting information related to automatic traveling is changed after the work vehicle starts automatic traveling corresponding to the first target route, a second target route with reference to a work-completed route along which the work vehicle has performed work immediately before the setting information is changed, the second target route being different from a straight route currently being traveled by the work vehicle; and cause the work vehicle to automatically travel in accordance with the second target route.

* * * * *